United States Patent Office 3,169,982
Patented Feb. 16, 1965

3,169,982
PROCESS FOR THE PRODUCTION OF O,O-DIALKYL-S-CARBAMIDO-METHYL THIOL- AND -THIONOTHIOL PHOSPHORIC ACID ESTERS
Günter Oertel, Cologne-Flittard, and Hugo Malz, Leverkusen, Germany, assignors to Farbenfabriken Bayer Aktiengesellschaft, Leverkusen, Germany, a corporation of Germany
No Drawing. Filed May 28, 1963, Ser. No. 283,695
Claims priority, application Germany, May 30, 1962, F 36,943
7 Claims. (Cl. 260—461)

The present invention relates to and has as its object a novel process for the production of O,O-dialkyl-S-(carbamidomethyl)thiol- or -thionothiol phosphoric acid esters in which the amino group is substituted once or twice by alkyl or alkylene radicals or wherein the nitrogen atom is a member of a heterocyclic ring system.

There are already known several methods for the preparation of the said compounds, especially the O,O-dimethyl - S - (N - methylcarbamidomethyl)thionothiol phosphoric acid ester.

For example it is possible to react salts of O,O-dimethylthionothiol phosphoric acid with N-methylchloroacetamide (cf. E. J. Hoegberg and J. T. Cassaday, Journal of the American Chemical Society, vol. 73, 557 (1951); and the specification of U.S. Patent No. 2,494,283), in accordance with the following equation:

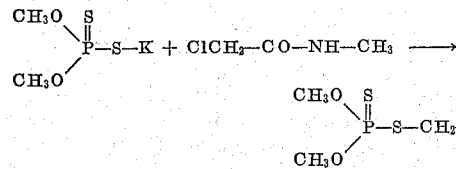

However, this reaction does not proceed smoothly and uniformly in the desired direction, since under the conditions of reaction, an alkylation reaction also takes place at the same time to produce considerable amounts of salt-like side products, for instance one of the following Formula II, and since the yield of the product I is consequently reduced to 60% of the theoretical (cf. G. Berkelhammer and coworkers, Journal of organic Chemistry, vol. 26, 2281 (1961)):

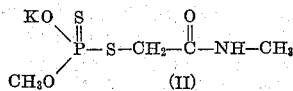

Some other processes have been published more recently in the literature which permit the preparation of the desired compounds under more gentle conditions. These are the processes of French patent specification No. 1,234,879, of German specification No. 1,076,662, as well as a method described by G. Berkelhammer and coworkers (see above).

All these methods agree in that they start with O,O-dimethyl-thionothiolphosphoryl-acetic acid or its derivatives rather than the readily available O,O-dimethylthionothiol phosphoric acid or its salts.

Thus, according to French patent specification No. 1,234,879, O,O - dimethyl-thionothiol-phosphoryl-acetic acid (III), which has first to be prepared from the sodium salt of O,O-dimethyl-thionothiolphosphoric acid by the action of chloroacetic acid, is reacted with benzoyl chloride to give the corresponding mixed anhydride (IV) which is subsequently decomposed with methylamine to give the desired compound (I) and the methylammonium salt of benzoic acid.

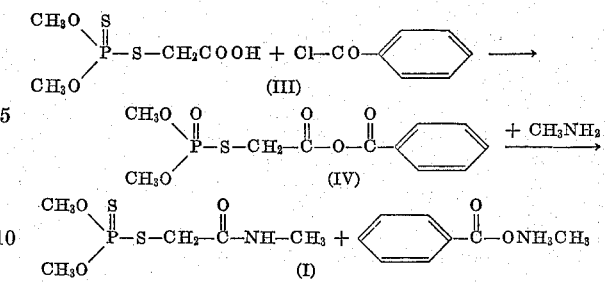

The process described in the German patent specification No. 1,076,662 starts with the phenyl ester of O,O-dimethyl-thionothiolphosphoryl-acetic acid (V), which can be obtained by the reaction of sodium O,O-dimethyl-thionothiolphosphate with the phenyl ester of chloroacetic acid, and this is decomposed by the action of methylamine to give the desired compound (I) and phenol.

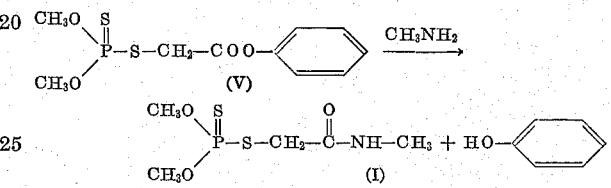

Another similar process also starts with O,O-dimethyl-thionothiolphosphoryl-acetic acid (III). This is reacted with phosphorous acid-ethylene-ester chloride and triethylamine to give the intermediate product (VI) which is decomposed with methylamine to give compound (I).

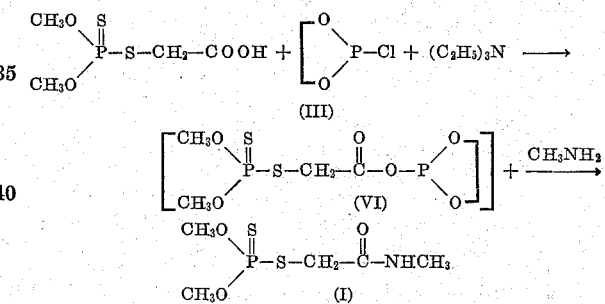

It has already been stated above that the three last mentioned processes require O,O-dimethyl-thionothiol-phosphoryl-acetic acid or its esters as their starting materials. Since the acid (III) is only available at yields of about 55% of the theoretical by the known reaction of salts of O,O-dimethyl-thionothiol phosphoric acid (cf. G. Berkelhammer and coworkers, cited above), the technical application of these processes suffers from considerable disadvantages with regard to the starting material. In addition all of these processes proceed via several stages and are therefore technically very wasteful.

The subject of the present invention is a novel and useful process for the production of O,O-dialkyl-S-(carbamidomethyl)thiol- or -thionothiol phosphoric acid esters, which avoids the above mentioned disadvantages of the known processes.

According to the invention, salts of O,O-dialkyl-thiol- or -thionothiol phosphoric acids or mixtures of the free O,O-dialkyl-thiol- or -thionothiol phosphoric acids with acid binding agents are reacted with chloroacetyl chloride in a molar ratio of about 2:1. This produces an intermediate product which is converted without prior isolation to the desired products by the action of primary or secondary amines in a molar ratio of about 1:2. Any desired salts of O,O-dialkyl-thiol- or -thionothiol phosphoric acids, such as for instance the sodium, potassium or ammonium salt, as well as the salts of aliphatic amines, particularly the methylammonium salt, are suitable as the starting materials for the process according to the invention. In addition, the free thiol- or thionothiol phosphoric acids may also be employed in a mixture with acid binding agents such as for instance potassium carbonate, tertiary amines etc.

The reaction on which the process according to the invention is based can be formulated as follows, by way of example, starting from the methylammonium salt of O,O-dimethyl-thionothiol phosphoric acid (VII):

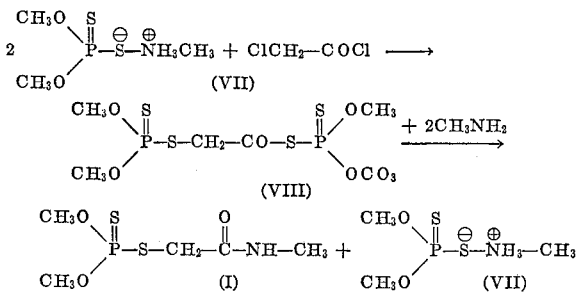

Accordingly, the salt (VII) first reacts with chloroacetyl chloride to form the intermediate product (VIII), which decomposes smoothly by the action of methylamine to give the desired product of the process (I) and 1 mole of the ammonium salt of O,O-dimethyl-thionothiol phosphoric acid (VII).

By the inventive procedure the reaction products are obtained in a high yield and can be separated in a known manner from the salts formed at the same time, for instance simply by washing them out with water. The desired O,O-dialkyl-S-(carbamidomethyl)thiol- or -thionothiol phosphoric acid esters are obtained in a very pure form by this method. The ammonium salts formed as by-products can be recycled again as starting materials for the reaction of the process according to this invention.

In general, the process is best carried out in practice so that the chloroacetyl chloride is introduced dropwise at 0–50° C. into a solution or suspension of salt of an O,O-dialkyl-thiol- or -thionothiolphosphoric acid or into a solution of thiol- or -thionothiol phosphoric acids with the equivalent amount of an acid binding agent in an inert solvent, such as optionally chlorinated hydrocarbons for instance benzene, chlorobenzene, toluene, xylene, carbon tetrachloride, methylene chloride, chloroform or aliphatic ketones, for instance acetone, methylethylketone, methylisopropylketone and methylisobutylketone. When the weakly exothermal reaction has subsided, the appropriate amine is passed at 0–50° C. into the reaction mixture, optionally after first filtering off the precipitated salts. The salts are then separated from the reaction mixture by a method known in principle, for example by filtration or by washing them out with water, and the desired product of the process is thereafter isolated, for instance by evaporation of the solution. Compared with the previously known processes mentioned above, the process according to the invention is characterised by the following advantages:

Compounds which are readily available technically are employed as starting materials, for instance O,O-dimethyl-thionothiol phosphoric acid or its salts and chloroacetyl chloride.

Starting from these simple compounds, the process yields the desired end products in a single reaction stage. The reaction products are obtained at a high yield and with excellent purity.

The ammonium salts of the O,O-dialkyl-thiol- or -thiono-thiol phosphoric acids which are formed at the same time can be recycled again to serve as new starting materials for the inventive process.

The products obtainable according to the present invention are distinguished by excellent insecticidal properties and therefore they are used as plant protecting and pest control agents.

The process is illustrated by the following examples.

*Example 1*

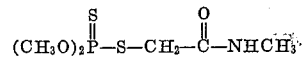

360 g. of ammonium O,O-dimethyl-thionothiolphosphate are dissolved in 1.5 l. of acetone, 113 g. of chloroacetyl chloride are added dropwise at 0–20° C. to this solution, when a weakly exothermal reaction occurs. Subsequently the mixture is stirred at 10 to 20° C. for 1 hour, and then it is separated from the precipitated ammonium chloride by filtration. 62 g. of methylamine are passed into the filtrate at 0–10° C. The solution is then evaporated under reduced pressure at 10–40° C. The residue is taken up in a little benzene and the benzene solution is washed with water. Then the organic layer is dried over sodium sulphate and evaporated in vacuo. 183 g. (80% of the theoretical yield) of the O,O-dimethyl-S - (N - methylcarbamido - methyl)thionothiolphosphoric acid ester remain as the residue in the form of a clear light yellow oil, which crystallises after standing for a short time and then shows a melting point of 50° C.

*Example 2*

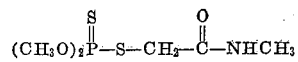

189 g. of methylammonium O,O-dimethyl-thionothiolphosphate are dissolved in 600 cc. of acetone. 56.5 g. of chloroacetyl chloride are added dropwise at 5° C. to this solution, when a weakly exothermal reaction occurs. The reaction mixture is stirred at 5° C. for another 15 minutes and 31 g. of methylamine are thereafter passed in at 0° C. The resultant suspension is evaporated in vacuo at 10–20° C. The viscous residue is taken up in benzene, the clear benzene solution is washed with water several times and then evaporated. 90 g. of a light yellow oil remain, which solidifies to an almost colourless wax after standing for a short time or immediately on trituration. When triturated with petroleum ether the O,O-dimethyl-S-(N-methylcarbamido-methyl) thionothiolphosphoric acid ester as a bright powder of melting point 49–50° C. is obtained.

*Example 3*

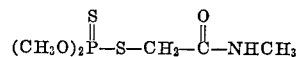

56.5 g. of chloroacetyl chloride dissolved in 100 cc. of acetone are added dropwise at 0–10° C. to a solution of 175 g. of ammonium O,O-dimethyl-thionothiolphosphate in 800 cc. of acetone. A weakly exothermal reaction occurs accompanied by the separation of ammonium chloride. The resultant suspension is stirred at 10° C. for 15 minutes and is then filtered off to remove the precipitated salt. Subsequently methylamine is passed into the filtrate at 0° C. until its reaction is slightly alkaline, about 31–32 g. of methylamine being required for this purpose. The acetone solution is evaporated under reduced pressure at 20° C., the residue taken up in a little benzene, and the benzene solution is washed with water until it is free from salts. After it has been dried over sodium sulphate the organic layer is evaporated in vacuo. 100 g. (88% of the theoretical yield) of the O,O-dimethyl-S-(N-methylcarbamidomethyl)thionothiolphosphoric acid ester remain as the residue in the form of a clear oil which crystallises after standing for a short time.

*Example 4*

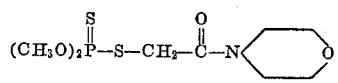

47 g. of methylammonium O,O-dimethyl-thiono-thiol-phosphate are partially dissolved in 100 cc. of acetone. A solution of 14.1 g. of chloroacetyl chloride in 50 cc. of acetone is added dropwise, with stirring, to this mixture at temperatures between 5 and 15° C. When the reaction has been completed, the mixture is stirred for about ¼ hour longer and then the precipitated methyl-ammonium chloride is removed by filtering with suction. The filtrate is subsequently treated with a solution of 20.5 g. of morpholine in 50 cc. of acetone at temperatures between 5 and 15° C., whilst stirring. When stirring has been continued for about ¼ hour, the mixture is evaporated under reduced pressure. The residue from the distillation is taken up in about 200 cc. of benzene, the benzene solution is washed twice with water, then dried over sodium sulphate, and evaporated in vacuo. There are obtained 27 g. of O,O-dimethyl-S-(morpholyl-carbamidomethyl)thionothiolphosphoric acid ester in the form of a colourless oil which crystallises completely on standing and after recrystallisation from ethanol has a melting point of 62° C.

*Example 5*

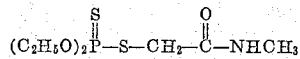

22.6 g. of chloroacetyl chloride dissolved in 50 cc. of acetone are added dropwise, with stirring, to a solution of 82 g. of ammonium O,O-diethyl-thionothiolphosphate in 200 cc. of acetone at temperatures between 10 and 25° C. The precipitated ammonium chloride is filtered off with suction, and methylamine gas is passed into the filtrate at 10 to 25° C. until 12.5 g. have been absorbed. The clear solution is evaporated under reduced pressure, the residue from distillation is taken up in 200 cc. of benzene, and the benzene solution washed twice with water. After the latter has been dried over sodium sulphate, it is evaporated in vacuo and the O,O-diethyl-S-(N-methylcarbamidomethyl)thionothiol phosphoric acid ester is obtained as a light brown oil which cannot be distilled without decomposition.

The yield amounts to 52 g.

*Example 6*

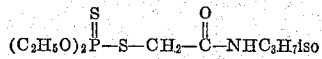

The compound of the above constitution is obtained as a light yellow oil at yields of about 90% of the theoretical by the same method as described in Example 5, when 0.2 mole of ammonium O,O-diethyl-thionothiolphosphate are reacted with 0.1 mole of chloroacetyl chloride in acetone and a solution of 0.2 mole of isopropylamine in acetone is subsequently added dropwise. The refractive index of the compound is $n_D^{20}$: 1.5122.

We claim:
1. A process for the production of an O,O-dialkyl-S-carbamido methyl thiophosphoric acid ester having the formula

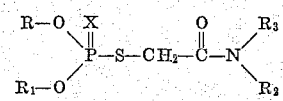

wherein R and $R_1$ stand for alkyl, X stands for a member of the group consisting of O and S, $R_3$ when taken alone stands for hydrogen, $R_2$ when taken alone stands for lower alkyl and $R_3$ and $R_2$ when taken together with N stand for morpholinyl, comprising reacting a compound of the formula

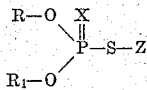

wherein R, $R_1$ and X are defined as above and Z is a member selected from the group consisting of sodium, potassium, ammonia and lower alkyl amine, with chloroacetylchloride in a molar ratio of about 2 to 1, reacting the resulting intermediate product with an amine of the formula

wherein $R_3$ and $R_2$ are defined as above in a molar ratio of about 1 to 2 and recovering the O,O-dialkyl-S-carbamidomethyl thiophosphoric acid ester thus formed.

2. A process for the production of an O,O-dialkyl-S-carbamido methyl thiophosphoric acid ester having the formula

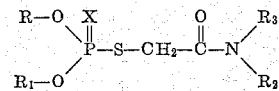

wherein R and $R_1$ stand for alkyl, X stands for a member of the group consisting of O and S, $R_3$ when taken alone stands for hydrogen, $R_2$ when taken alone stands for lower alkyl and $R_3$ and $R_2$ when taken together with N stand for morpholinyl, comprising reacting a mixture of a compound of the formula

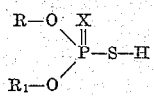

wherein R, $R_1$ and X are defined as above with equivalent amounts of acid binding agents, with chloroacetylchloride in a molar ratio of about 2 to 1, reacting the resulting intermediate product with an amine of the formula

wherein $R_3$ and $R_2$ are defined as above in a molar ratio of about 1 to 2 and recovering the O,O-dialkyl-S-carbamidomethyl thiophosphoric acid ester thus formed.

3. A process according to claim 1 wherein X is sulfur.
4. A process according to claim 1 wherein X is sulfur, $R_3$ is hydrogen, $R_2$ is lower alkyl and Z is ammonia.
5. A process according to claim 1 wherein R and $R_1$ are methyl, X is sulfur, $R_3$ is hydrogen, $R_2$ is methyl and Z is ammonia.
6. A process according to claim 1 wherein R and $R_1$ are ethyl, X is sulfur, $R_3$ is hydrogen, $R_2$ is methyl and Z is ammonia.
7. A process according to claim 1 wherein R and $R_1$ are ethyl, X is sulfur, $R_3$ is hydrogen, $R_2$ is isopropyl and Z is ammonia.

No references cited.